United States Patent
Ranjan et al.

(10) Patent No.: US 12,204,402 B2
(45) Date of Patent: Jan. 21, 2025

(54) ROOT CAUSE ANALYSIS WITHIN A CENTRALIZED SERVICE MANAGEMENT PLATFORM

(71) Applicant: RAKUTEN MOBILE, INC., Tokyo (JP)

(72) Inventors: Tapas Ranjan, Tokyo (JP); Pratik Parikh, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/012,724

(22) PCT Filed: Sep. 30, 2022

(86) PCT No.: PCT/US2022/045310
§ 371 (c)(1),
(2) Date: Dec. 23, 2022

(87) PCT Pub. No.: WO2024/072401
PCT Pub. Date: Apr. 4, 2024

(65) Prior Publication Data
US 2024/0264895 A1   Aug. 8, 2024

(51) Int. Cl.
*G06F 11/07* (2006.01)
(52) U.S. Cl.
CPC ........ *G06F 11/0793* (2013.01); *G06F 11/079* (2013.01)

(58) Field of Classification Search
CPC .......................... G06F 11/0793; G06F 11/079
See application file for complete search history.

(56) References Cited

U.S. PATENT DOCUMENTS

| | | | |
|---|---|---|---|
| 11,568,344 B2* | 1/2023 | Andina Silva | H04L 41/5074 |
| 2019/0361760 A1* | 11/2019 | Krishnan | G06F 11/076 |
| 2021/0350383 A1 | 11/2021 | Lee et al. | |
| 2022/0129287 A1 | 4/2022 | Permenter et al. | |

OTHER PUBLICATIONS

Written Opinion of the International Searching Authority dated Jan. 25, 2023 in Application No. PCT/US22/45310.
International Search Report dated Jan. 25, 2023 in Application No. PCT/US22/45310.

* cited by examiner

*Primary Examiner* — Nadeem Iqbal
(74) *Attorney, Agent, or Firm* — Sughrue Mion, PLLC

(57) ABSTRACT

A method and system of managing services via a centralized network platform using root cause analysis (RCA). The method can include configuring a format of a service ticket in response to a first user input; based on one or more second user inputs for configuring an RCA template, creating the RCA template, wherein the RCA template comprises a plurality of user input (UI) fields for receiving user input with respect to RCA for the service ticket; and mapping the RCA template to the service ticket.

17 Claims, 18 Drawing Sheets

SERVICE MANAGEMENT PLATFORM    [Search]    [Ticket Family Master ∨]    [Create Ticket]

Administration > Ticket Family Master

General Configuration <

- Workspace
- Workflow Builder
- View Builder
- Ticket Family Master
- Subticket Master
- Domain Master
- Subdomain Master
- Category Master
- Subcategory Master
- Priority Matrix
- Priority Master
- Urgency Master
- Impact Master
- Workflow Status Master
- Naming Master
- Service Master Displaying 19 of 19

| Status | Ticket Family | Integration Type | Default Value | Description | Subticket |
|---|---|---|---|---|---|
| Inactive | TICKET 1 | Internal | No | DESCRIPTION 1 | - |
| Active | TICKET 2 | Internal | No | DESCRIPTION 2 | - |
| Active | TICKET 3 | Internal | No | DESCRIPTION 3 | 01 Associated ST |
| Active | TICKET 4 | Internal | Yes | DESCRIPTION 4 | 01 Associated ST |
| Active | TICKET 5 | Internal | No | DESCRIPTION 5 | 01 Associated ST |
| Active | TICKET 6 | Internal | No | DESCRIPTION 6 | - |
| Active | TICKET 8 | Internal | No | DESCRIPTION 7 | - |
| Active | TICKET 9 | Internal | No | DESCRIPTION 8 | 01 Associated ST |
| Active | TICKET 10 | Internal | No | DESCRIPTION 9 | 01 Associated ST |
| Inactive | TICKET 11 | Internal | No | DESCRIPTION 10 | - |
| Active | TICKET 12 | Internal | No | DESCRIPTION 11 | 01 Associated ST |
| Active | TICKET 13 | Internal | No | DESCRIPTION 12 | - |
| Active | TICKET 14 | Internal | No | DESCRIPTION 13 | 01 Associated ST |
| Active | TICKET 15 | External | No | DESCRIPTION 14 | - |
| Active | TICKET 16 | External | No | DESCRIPTION 15 | - |

New Subdomain                                                      ✕

Subdomain Name*                          Subdomain Key*
[Subdomain Name            ]             [Subdomain Key              ]
Description*               0 / 100                                0 / 7
[Description                                                          ]

Ticket Family*                           Domain                  0 / 500
[▭ Select Ticket Family    ▽]            [Select Domain             ▽]

Add Icon
┌─ ─ ─ ─ ─ ─ ─ ─ ─ ─ ─ ─ ─ ─ ─ ─ ─ ─ ─ ─ ─ ─ ─ ─ ─ ─┐
│                        ⌂                           │
│                  Drag and Drop here                │
│                         or                         │
└─ ─ ─ ─ ─ ─ ─ ─ ─ ─ ─ ─ ─ ─ ─ ─ ─ ─ ─ ─ ─ ─ ─ ─ ─ ─┘

[Cancel]  [Create]

SERVICE MANAGEMENT PLATFORM

Administration > RCA Master > Template Configu....

🔍 Search Apps    Apps ⌄    💬 👤 ®

| General Configuration ‹ | Template Name | Ticket Family | Priority |
|---|---|---|---|
| | Root Cause Analysis | RPT - Problem Ticket | P2 - Critical |

+

| | |
|---|---|
| Purpose & Scope | ✎ 🗑 |
| Problem Details | |
| Problem Description | ✎ 🗑 |
| Impact | ✎ 🗑 |
| Background Summary | ✎ 🗑 |
| Chronology of event | |
| N/W Diagram Flow | ✎ 🗑 |
| Analysis Method | ✎ 🗑 |
| Technical findings | ✎ 🗑 |
| Root Cause | |
| Lessons Learned | ✎ 🗑 |

- Workspace
- Workflow Builder
- View Builder
- Ticket Family Master
- Subticket Master
- Domain Master
- Subdomain Master
- Category Master
- Subcategory Master
- Priority Matrix
- Priority Master
- Urgency Master
- Impact Master
- Workflow Status Master
- Naming Master
- Service Master

ROOT CAUSE ANALYSIS WITHIN A CENTRALIZED SERVICE MANAGEMENT PLATFORM

CROSS REFERENCE TO RELATED APPLICATIONS

This application is a National Stage of International Application No. PCT/US2022/045310 filed Sep. 30, 2022.

BACKGROUND

Technical Field

The present disclosure described herein relates to root cause analysis within a centralized service management network platform.

Background

A trouble ticket service platform is generally an incident management system for tracking the detection, reporting, and resolution of some kind of problem within an organization or a telecommunications network. Further, it is generally necessary to obtain detailed information with respect to problems encountered by a customer using a service provider's network (or an organization's services) in order to promptly and correctly diagnose the problem. Further, customer support agents or technicians must generate the trouble ticket that accurately reflects problems conveyed to the customer support agent or technicians by the customer. Various tools have been available in the market to provide such incident management, problem management, or service requests and related processes in the form of fixed templates where users or support agents can modify existing workflows and views. However, existing platforms do not provide the users or support agents the ability to modify existing templates or create new custom templates and service workflows.

In particular, conventional systems do not allow for the creation of unique processes or workflows and customizing specific data within a process or workflow. Further, such conventional systems are generally limited to information technology (IT) operations or departments. Further problem managers generally follow old ways of documenting root cause analysis (RCA) in spreadsheets and word processing documents, wherein such RCA is used to identify the root cause of an incident, problem, or issue. Therefore, it can be difficult to maintain individual files for every issue and the data cannot be easily referred to in the scenario of an ongoing service issue. This can lead to recurrence of service issues, depreciation in quality of service, and overall financial loss to the business. Hence, conventional service management systems are highly rigid in structure, inefficient in implementation and operation, and require significant human and computing resources.

Hence, what is needed is a centralized service or incident management platform that requires minimum energy consumption, is resource efficient, is less taxing on computing resources and network elements, and can provide high customer satisfaction. In addition, what is needed is easy and simple accessibility to RCA through a central knowledge repository which can be suggested to users when they create new tickets for faster resolution of various issues.

SUMMARY

According to example embodiments, a root cause analysis (RCA) within a centralized service or incident management platform is disclosed having a trouble ticket family or ticket hierarchy framework which can form the basis for which users can operate within the service management platform. For example, multiple ticket families can be created for individual processes, wherein each ticket family includes its own specific values for a domain, subdomain, category, subcategory, priority, impact, urgency, workflow, views, and a naming rule. Each ticket family can allow businesses to create multiple processes with their own individual identities. Accordingly, the service management platform of the disclosure described herein is not limited to IT or network operations and departments, but can also be used by other areas and aspects of a service provider's business, such as human resources (HR) and marketing operations and departments. Further, easy and simple accessibility to RCA through a central knowledge repository is disclosed which can be suggested to users when they open new tickets in order to provide faster resolution of various issues, among other advantages. The foregoing RCA can be enabled using a structured way of capturing the RCA data (e.g., via predefined templates), thereby resulting in more efficient operations within the organization, utilization of less computing resources, and overall better customer satisfaction.

According to other embodiments, a ticket family can be a central component within the service management platform of the disclosure described herein in which workflows, views, and master data such as domains, subdomains, categories, and subcategories are latched to or associated therewith. Further, a user can create multiple ticket families (e.g., master ticket families and sub-ticket families) with respect to various processes, wherein each ticket family (including linked families) can have multiple workflows which may be mapped to certain domains and categories.

According to an exemplary embodiment, to create a ticket (or a trouble ticket), a user can select a ticket family which may be associated with or related to certain processes, such as incident management, problem management, or service requests, among others. Within a ticket family there can be multiple workflows depending on the domain and category, including the workflows, domains, or categories that can capture different information. Each ticket family can have its own view latched or associated with user tasks in the workflow. Further, it is contemplated within the scope of the present disclosure described herein that the service management platform of the disclosure described herein can be used in various industries not limited to telecommunications and can further operate as a single central platform for all ticket management related to various departments or operations across an organization.

Some technical improvements of the service management platform system and method of the disclosure described herein over conventional systems can include, among others, providing a ticketing solution under one centralized network platform for all departments of an organization, thereby minimizing computing resources and improving operational efficiency. Further, the system and method of the disclosure described herein can create a ticket family master module within an administrator section of a dashboard which can include all the master modules from where data can be configured for each of the ticket families and an automated process for RCA, thereby further improving operational and ticket management efficiency. In addition, the service management platform of the disclosure described herein can allow organizations to introduce and adopt new processes for ticket management and RCA, thereby improving customer satisfaction, and minimizing the turnaround time needed to modify existing processes. In addition, other improvements can include faster onboarding, each process being denoted or labeled with its individual ticket family name for easy of searching for tickets, and quick and easy identification of tickets, problems, and solutions by end users and management of the organization, among other advantages.

According to one or more embodiments, a method of managing services via a centralized network platform includes configuring a format of a service ticket in response to a first user input; based on one or more second user inputs for configuring an RCA template, creating the RCA template, wherein the RCA template comprises a plurality of user input (UI) fields for receiving user input with respect to RCA for the service ticket; and mapping the RCA template to the service ticket.

According to one or more example embodiments, a system for managing services via a centralized network platform using root cause analysis (RCA) includes: at least one memory storing instructions; and at least one processor configured to execute the instructions to: configure a format of a service ticket in response to a first user input; based on one or more second user inputs for configuring an RCA template, create the RCA template, wherein the RCA template comprises a plurality of user input (UI) fields for receiving user input with respect to RCA for the service ticket; and map the RCA template to the service ticket.

According to one or more example embodiments, a non-transitory computer-readable medium includes computer-executable instructions executable by at least one processor to perform a method of managing services via a centralized network platform using root cause analysis (RCA), the method including: configuring a format of a service ticket in response to a first user input; based on one or more second user inputs for configuring an RCA template, creating the RCA template, wherein the RCA template comprises a plurality of user input (UI) fields for receiving user input with respect to RCA for the service ticket; and mapping the RCA template to the service ticket.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 6 illustrates a GUI portal illustrating various configurations and ticket families within the dashboard of the service management platform method and system of the disclosure described herein according to one or more embodiments;

FIG. 8 illustrates a GUI portal illustrating detailed ticket family information within the dashboard of the service management platform method and system of the disclosure described herein according to one or more embodiments;

FIG. 9B illustrates a GUI portal illustrating an input screen for creating a new domain within the dashboard of the service management platform method and system of the disclosure described herein according to one or more embodiments;

FIG. 10A illustrates a GUI portal illustrating an input screen for creating a new subdomain within the dashboard of the service management platform method and system of the disclosure described herein according to one or more embodiments;

FIG. 13 illustrates a GUI portal illustrating an input screen for creating a new RCA template within the dashboard of the service management platform method and system of the disclosure described herein according to one or more embodiments;

FIG. 14 illustrates a GUI portal illustrating various RCA template configuration options within the dashboard of the service management platform method and system of the disclosure described herein according to one or more embodiments;

FIG. 15 illustrates a GUI portal illustrating an input screen for adding a new RCA template configuration option within the dashboard of the service management platform method and system of the disclosure described herein according to one or more embodiments; and FIG. 16 illustrates a GUI portal illustrating an input screen for adding content for each RCA template configuration option within the dashboard of the service management platform method and system of the disclosure described herein according to one or more embodiments.

DETAILED DESCRIPTION

Figure 1:
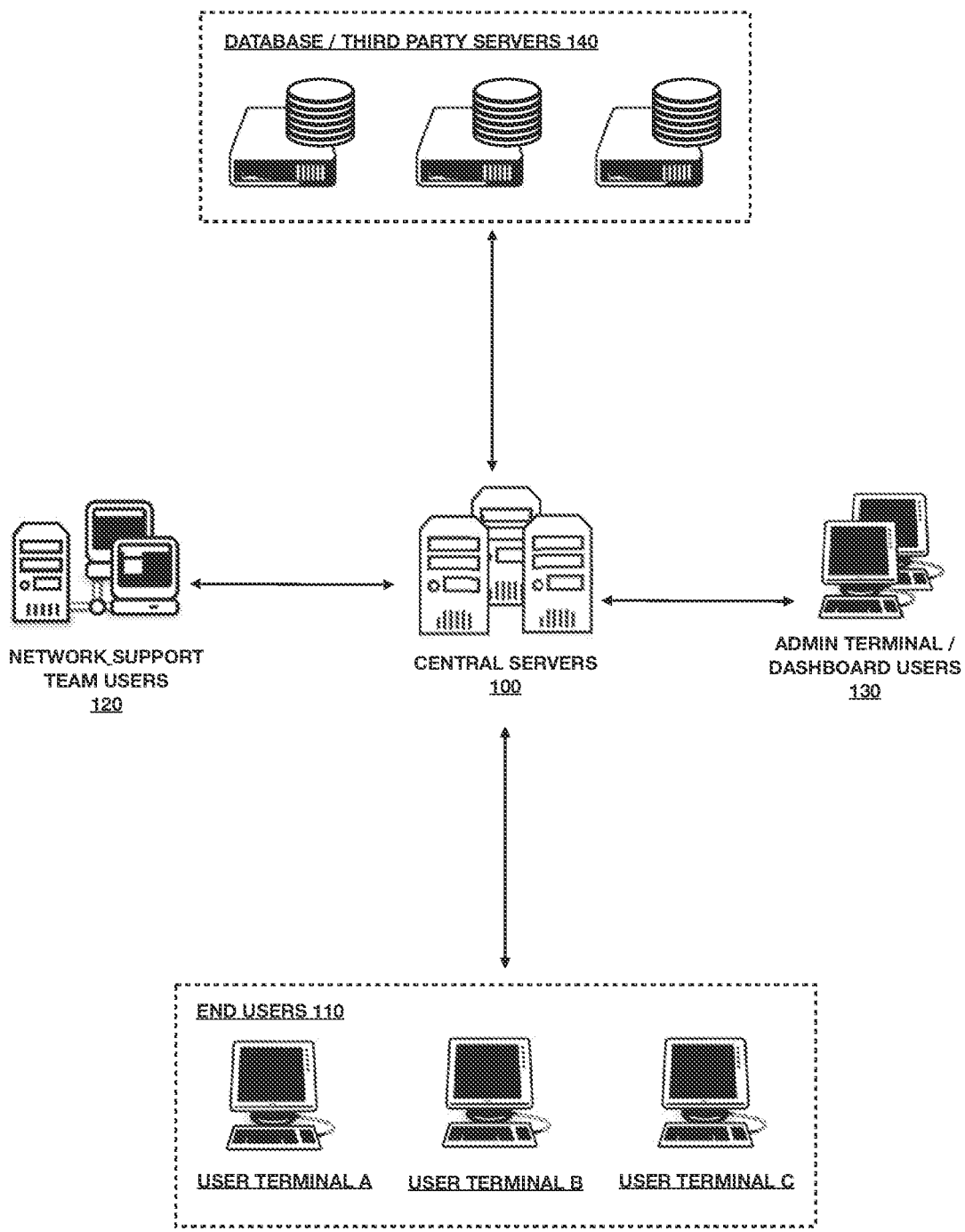
FIG. 1 illustrates a diagram of a general system architecture of the service management platform method and system of the disclosure described herein according to one or more embodiments.

The following detailed description of example embodiments refers to the accompanying drawings. The same reference numbers in different drawings may identify the same or similar elements.

The foregoing disclosure provides illustrations and descriptions, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the disclosure described herein, a display page may include information residing in the computing device's memory, which may be transmitted from the computing device over a network to a database center and vice versa. The information may be stored in memory at each of the computing device, a data storage resided at the edge of the network, or on the servers at the database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of networked device, including but not limited to mobile devices and phones such as cellular phones (e.g., any "smart phone"), a personal computer, server computer, or laptop computer; personal digital assistants (PDAs); a roaming device, such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices, such as devices including short-range ultra-high frequency (UHIF) device, near-field communication (NFC), infrared (IR), and Wi-Fi functionality, among others.

Phrases and terms similar to "software", "application", "app", and "firmware" may include any non-transitory computer readable medium storing thereon a program, which when executed by a computer, causes the computer to perform a method, function, or control operation.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also include a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, components, features, options, and/or attributes of the disclosure described herein. For example, the portal can be a web page accessed with a web browser, mobile device application, or any application or software residing on a computing device.

FIG. 1 illustrates a diagram of a general network architecture according to one or more embodiments. Referring to FIG. 1, end users 110, network support team users 120, and admin terminal/dashboard users 130 (collectively referred to herein as users 110, 120, and 130) can be in bi-directional communication over a secure network with central servers or application servers 100 according to one or more embodiments. In addition, users 110, 120, 130 may also be in direct bi-directional communication with each other via the network system of the disclosure described herein according to one or more embodiments. Here, users 110 can be any type of customer, network service provider agent, or vendor, among others, of a network or telecommunication service provider, such as users operating computing devices and user terminals A, B, and C. Each of users 110 can communicate with servers 100 via their respective terminals or portals, wherein servers 110 can provide or automatically operate the network impact prediction engine system and method of the disclosure described herein. Users 120 can include application development members or support agents of the network service provider for developing, integrating, and monitoring service platform management method and system of the disclosure described herein, including assisting, scheduling/modifying network events, and providing support services to end users 110. Admin terminal/dashboard users 130 may be any type of user with access privileges for accessing a dashboard or management portal of the disclosure described herein, wherein the dashboard portal can provide various user tools, GUI information, maps, graphs, and customer support options. It is contemplated within the scope of the present disclosure described herein that any of users 110 and 120 may also access the admin terminal/dashboard 130 of the disclosure described herein.

Still referring to FIG. 1, central servers 100 of the disclosure described herein according to one or more embodiments can be in further bi-directional communication with database/third party servers 140, which may also include users. Here, servers 140 can include vendors and databases where various captured, collected, or aggregated data, such as current, real-time, and past network related historical and KPI data, may be stored thereon and retrieved therefrom for network analysis, predictions, and simulations by servers 100. However, it is contemplated within the scope of the present disclosure described herein that the service management platform method and system of the disclosure described herein can include any type of general network architecture.

Still referring to FIG. 1, one or more of servers or terminals of elements 100-140 may include a personal computer (PC), a printed circuit board comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, one or more servers, terminals, and users 100-140 may include a set of components, such as a processor, a memory, a storage component, an input component, an output component, a communication interface, and a JSON UI rendering component. The set of components of the device may be communicatively coupled via a bus.

The bus may comprise one or more components that permit communication among the set of components of one or more of servers or terminals of elements 100-140. For example, the bus may be a communication bus, a cross-over bar, a network, or the like. The bus may be implemented using single or multiple (two or more) connections between the set of components of one or more of servers or terminals of elements 100-140. The disclosure is not limited in this regard.

One or more of servers or terminals of elements 100-140 may comprise one or more processors. The one or more processors may be implemented in hardware, firmware, and/or a combination of hardware and software. For example, the one or more processors may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The one or more processors also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The one or more processors may control overall operation of one or more of servers or terminals of elements 100-140 and/or of the set of components of one or more of servers or terminals of elements 100-140 (e.g., memory, storage component, input component, output component, communication interface, rendering component).

One or more of servers or terminals of elements 100-140 may further comprise memory. In some embodiments, the memory may comprise a random access memory (RAM), a read only memory (ROM), an electrically erasable programmable ROM (EEPROM), a flash memory, a magnetic memory, an optical memory, and/or another type of dynamic or static storage device. The memory may store information and/or instructions for use (e.g., execution) by the processor.

A storage component of one or more of servers or terminals of elements 100-140 may store information and/or computer-readable instructions and/or code related to the operation and use of one or more of servers or terminals of elements 100-140. For example, the storage component may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

One or more of servers or terminals of elements 100-140 may further comprise an input component. The input component may include one or more components that permit one or more of servers and terminals 100-140 to receive information, such as via user input (e.g., a touch screen, a keyboard, a keypad, a mouse, a stylus, a button, a switch, a microphone, a camera, and the like). Alternatively or additionally, the input component may include a sensor for sensing information (e.g., a global positioning system (GPS) component, an accelerometer, a gyroscope, an actuator, and the like).

An output component any one or more of servers or terminals of elements 100-140 may include one or more components that may provide output information from the device 100 (e.g., a display, a liquid crystal display (LCD), light-emitting diodes (LEDs), organic light emitting diodes (OLEDs), a haptic feedback device, a speaker, and the like).

One or more of servers or terminals of elements 100-140 may further comprise a communication interface. The communication interface may include a receiver component, a transmitter component, and/or a transceiver component. The communication interface may enable one or more of servers or terminals of elements 100-140 to establish connections and/or transfer communications with other devices (e.g., a server, another device). The communications may be enabled via a wired connection, a wireless connection, or a combination of wired and wireless connections. The communication interface may permit one or more of servers or terminals of elements 100-140 to receive information from another device and/or provide information to another device. In some embodiments, the communication interface may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, sixth generation (6G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface may provide for communications with another device via a device-to-device (D2D) communication link, such as FlashLinQ, WiMedia, Bluetooth, Zig-Bee, Wi-Fi, LTE, 5G, and the like. In other embodiments, the communication interface may include an Ethernet interface, an optical interface, a coaxial interface, an infrared interface, a radio frequency (RF) interface, or the like.

Figure 2:
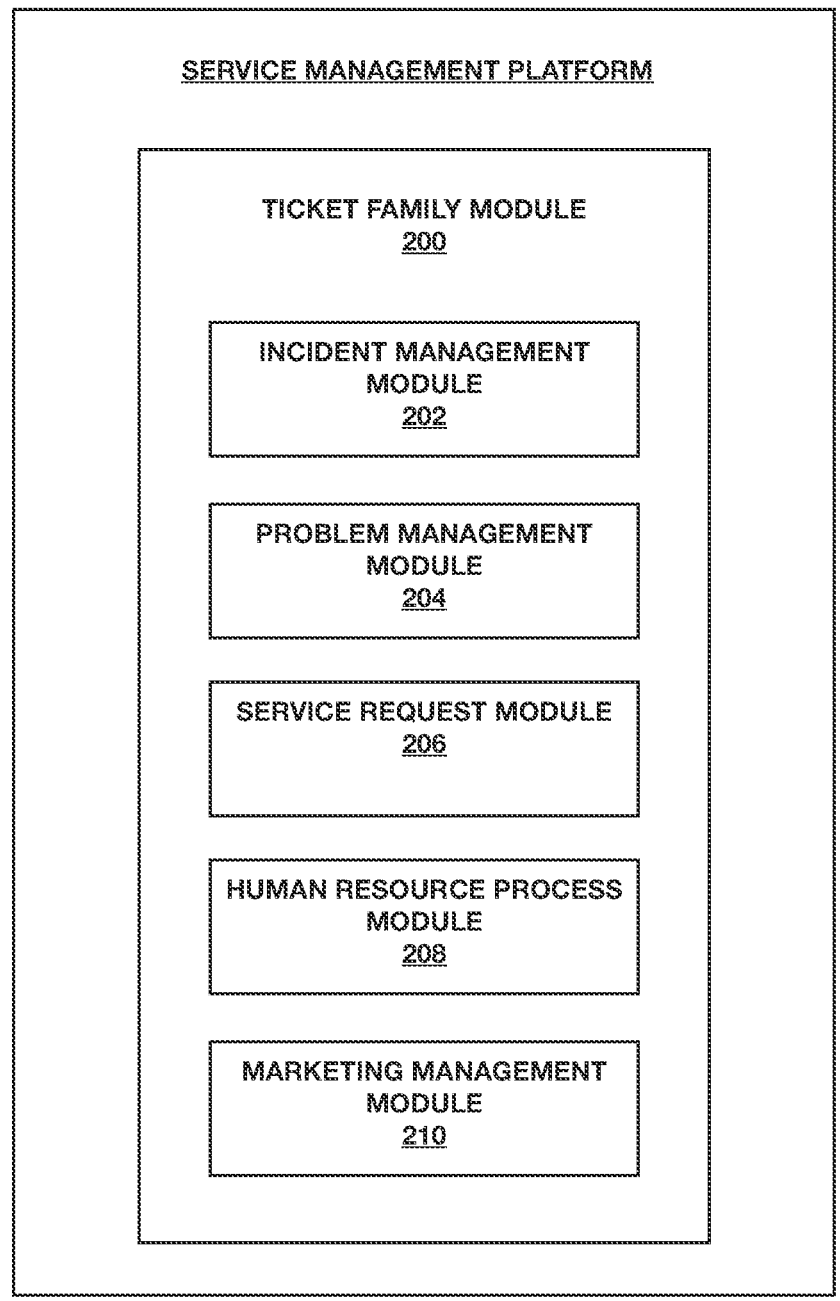
FIG. 2 illustrates a block diagram for various sub-modules within a ticket family module for the service management platform method and system of the disclosure described herein according to one or more embodiments.

FIG. 2 illustrates one exemplary embodiment of a ticket family module and various sub-modules for the centralized service management platform method and system of the disclosure described herein. Here, the ticket family module 200 can include an incident management module 202 for creating (or opening), editing, assigning, and managing various incident or problem tickets and ticket families within the platform, such as errors related to end-to-end network communications. Module 200 can also include a problem management module 204 for creating, editing, assigning, and managing various problem tickets associated with an organization's network, services, or products, such as network element causing errors. Module 200 can also include a service request module 206 for creating, editing, assigning, and managing tickets related to a particular customer service request, such as network component installation or repair. Module 200 can also include a human resource process module 208 for creating, editing, assigning, and managing tickets related to human resource requests within an organization, such as for the hiring of employees. In addition, module 200 may also include a marketing management module 210 for creating, editing, assigning, and managing tickets related to marketing for the organization, such as for various marketing or advertising campaigns or requests associated with products or services. Here, each module 202-210 can pertain to a particular business process, operation or department within an organization, or processes within the organization, that can be accessed and managed via the centralized service management platform. Further, each ticket family for each of the foregoing modules 202-210 can include a custom domain, subdomain, category, subcategory, priority, impact, urgency, workflow, views, and a naming rule associated with its respective ticket family, among other advantages.

According to an example embodiment, each ticket family may represent a particular business process (e.g., incident management, problem management, service request, release management, human resources processes, marketing, etc.) within an organization. Further, a ticket family may having multiple workflows each with their own respective views (e.g., ticket pages or forms) and respectively corresponding to (or associated with) different domains, subdomains, and/or categories. That is, within a configured ticket family corresponding to a particular process (e.g., incident management), there may be multiple workflows depending on the domain and/or category, which might capture different information relevant to that domain or category (via differently configured and latched views).

Figure 3:
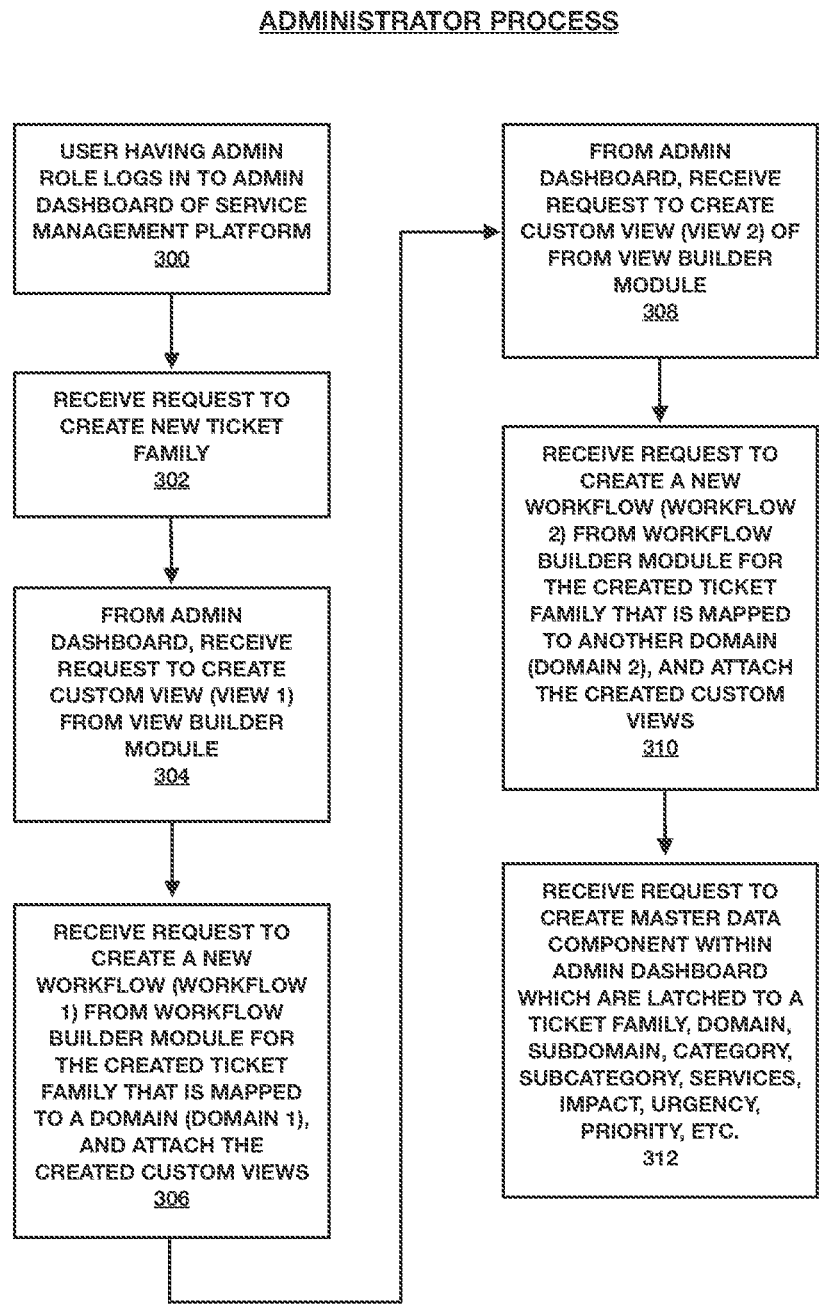
FIG. 3 illustrates a process flow diagram illustrating a method of creating a ticket family via an administrator for the service management platform method and system of the disclosure described herein according to one or more embodiments.
Figure 5:
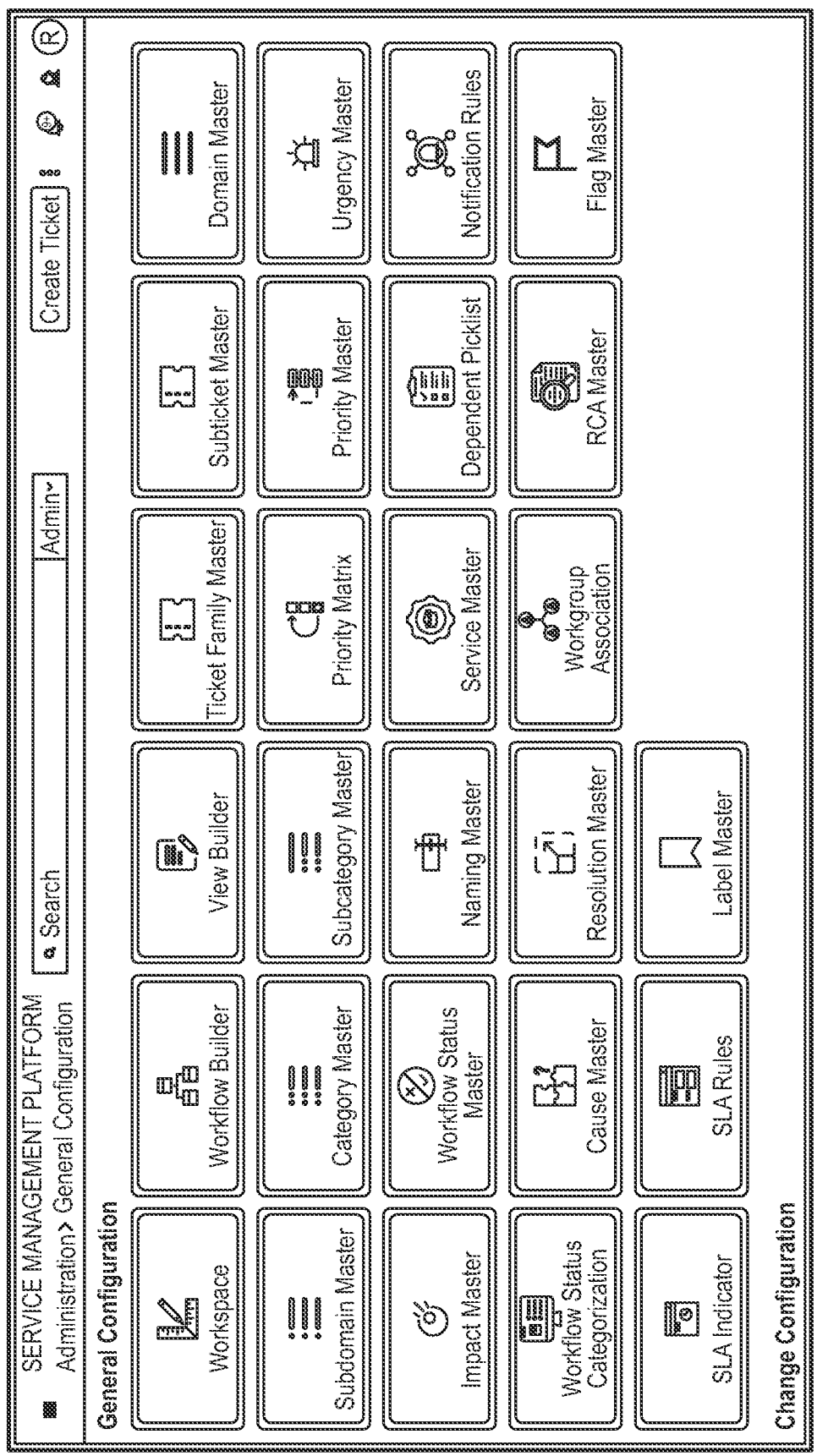
FIG. 5 illustrates a graphical user interface (GUI) portal of a dashboard for the service management platform method and system of the disclosure described herein according to one or more embodiments.

FIG. 3 illustrates one exemplary embodiment of a method of operation for an administrator to create a ticket family. At step 300, a user having administrator privileges can log in to an admin dashboard of the service management platform system and method of the disclosure described herein, such as shown in FIG. 5 illustrating a grid for various general configuration modules, applications, options, or components. As shown in FIG. 5, the user can select a module (e.g., service or application) for creating and/or configuring a ticket family, exemplified herein as the Ticket Family Master configuration module. Via this module, for example, the user can view or edit previously created ticket families and create a new ticket family.

Figure 9A:
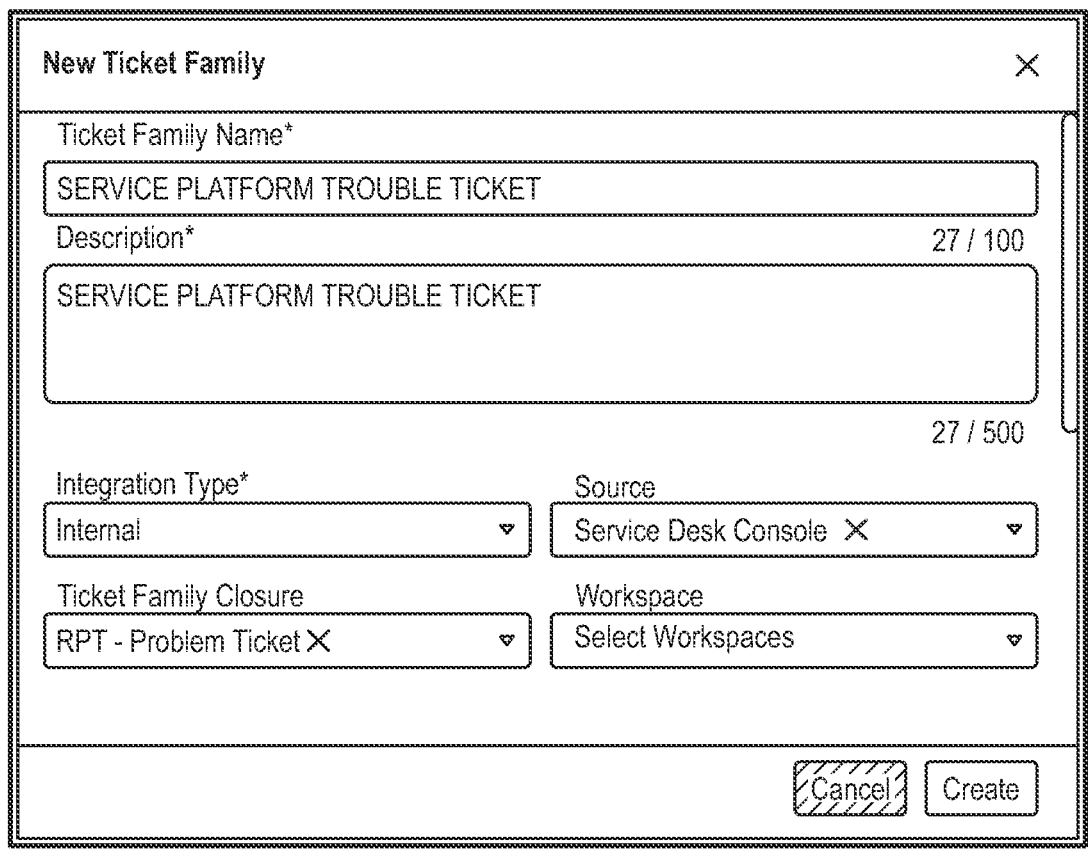
FIG. 9A illustrates a GUI portal illustrating an input screen for creating a new ticket family within the dashboard of the service management platform method and system of the disclosure described herein according to one or more embodiments.

Next, at step 302, the service management platform system and method can receive a request from the user to create a new ticket family from a view or page of the ticket creation module (e.g., Ticket Family Master), such as shown in FIG. 6, wherein said view may list active, pending, or closed tickets of various previously-created ticket families. Based on the user selection to create a new ticket family, a graphical user interface (GUI) for creating the new ticket family by configuring various parameters of the new ticket family (e.g., name, description, integration type, source application from which the ticket may be opened, etc.) is displayed, as shown in FIG. 9A. Through this GUI, the user can input a name for the new ticket family as well as a description. Further, the user may select an integration type (internal or external), to thereby configure whether the ticket family is to be integrated with an application within the platform of the user's enterprise or organization, or with an external platform. Further, the user may select a source application or module within the application platform that the ticket family will be accessible, viewable, etc., through (e.g., through which tickets of that ticket family may be created, worked on, handled, etc.). The user may also configure a ticket family closure setting, through which a user can select another ticket family as a suggested course of action if resolution of a ticket opened in the new ticket family is not attainable, for example (e.g., if a ticket of the new ticket family cannot be resolved, then a problem ticket selected via the ticket family closure setting may be suggested to the ticket handler). Additionally, the user may specify one or more workspaces (or users, user groups, etc.) that can create or open a ticket of the new ticket family.

Next, at step 304, the system and method can receive a request from the user to create and configure one or more custom views (View 1) (e.g., a page or form with various user input fields such as text fields, drop down menus, rich text editor fields requiring input from an end user, etc.) from a View Builder configuration module. The view may be a page or form for an opened ticket corresponding to the ticket family (e.g., a workflow of the ticket family), through which data or information may be input by a user and captured. A particular ticket may include one or more views that are displayed to a ticket handler and through which information is input and captured, in accordance with a workflow of the ticket family.

Figures 7A, 7B:
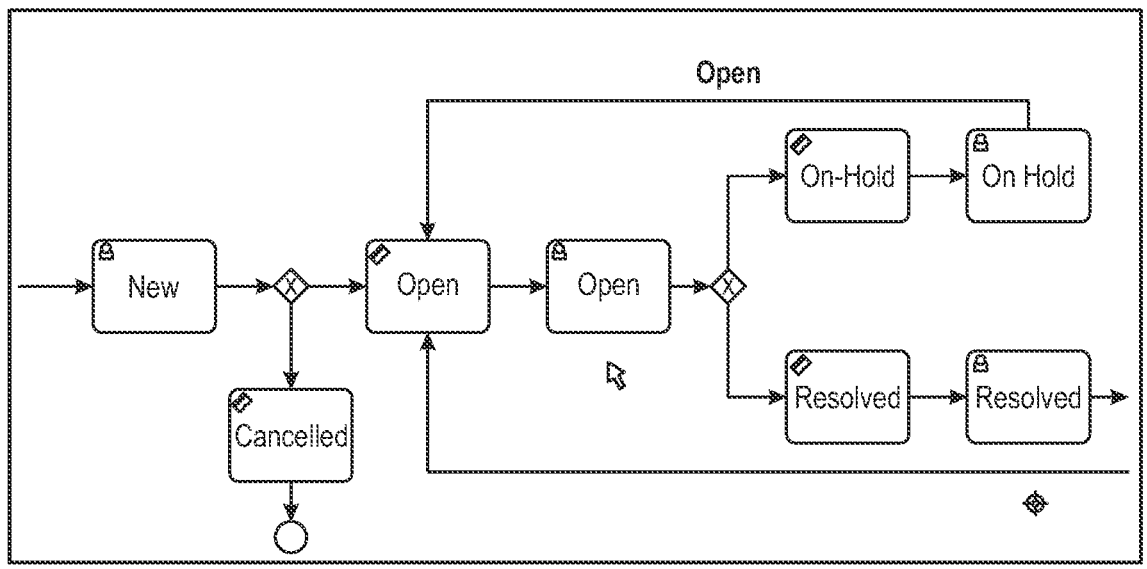
FIG. 7A illustrates a GUI portal illustrating an input screen for creating a new workflow within the dashboard of the service management platform method and system of the disclosure described herein according to one or more embodiments.
FIG. 7B illustrates a GUI portal of an exemplary workflow diagram within the dashboard of the service management platform method and system of the disclosure described herein according to one or more embodiments.
Figure 9B:
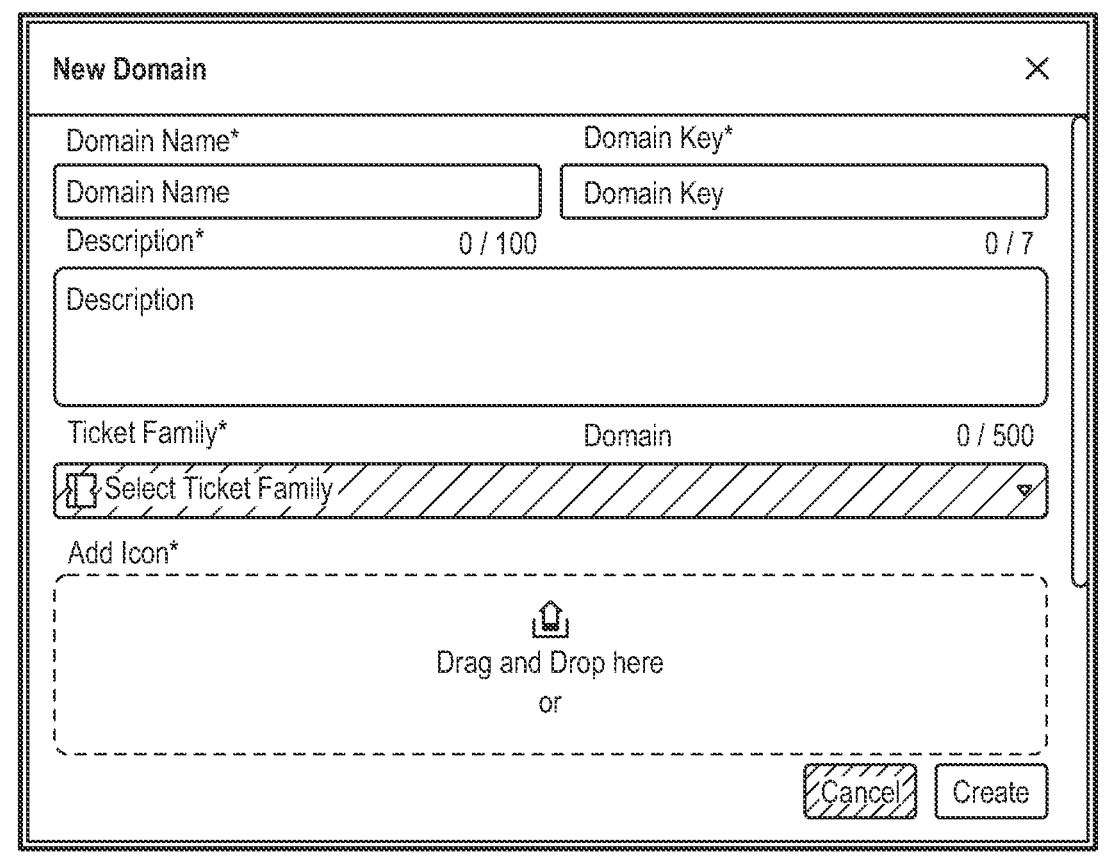
Figure 10B:
FIG. 10B illustrates a GUI portal illustrating an input screen for creating a new category within the dashboard of the service management platform method and system of the disclosure described herein according to one or more embodiments.

Next, at step 306, the system and method can receive a request from the user to create a new workflow (Workflow 1) for the ticket family. The workflow may be created via a distinct service or application, exemplified here as a Workflow Builder configuration module. The workflow is mapped or latched to the created ticket family by selecting the created ticket family in a configuration page or GUI for creating the workflow, as shown by way of example in FIG. 7A. Further, in generating or configuring the workflow through the configuration module, the user can add the view(s) created in step 304 to the workflow (e.g., to one or more stages of the workflow). An example of a created workflow is shown in FIG. 7B. Moreover, the workflow may be mapped, linked, latched, or associated with a domain (Domain 1), a subdomain, a category and/or a subcategory, each of which may be mapped or latched to the ticket family. The domains and subdomains may be any of various breakdowns (e.g., departments, functional units, etc.) within an organization, and can be generic for information technology service management (ITSM) across industries. That is, the domains and subdomains may vary and be customized per a particular organization's needs. The domains, subdomains, categories, and sub-categories may be created and configured via respective modules, and may be associated with a ticket family via an input selection to a GUI for configuring the same, as shown by way of example in FIGS. 9B, 10A, and 10B.

As set forth above, in accordance with an example embodiment, a plurality of different workflows and associated views may be configured for the same ticket family. The corresponding workflows and views for an opened ticket in that ticket family may be selected by an end user based on the domain, subdomain, category, and/or subcategory selected by the user when creating or opening the ticket.

To this end, referring back to FIG. 3, at step 308, the system and method can receive a request from the user to create one or more other custom views (View 2) from the View Builder configuration module. Step 308 is similar to step 304, and redundant descriptions thereof may not be repeated below.

Next, at step 310, the process can receive a request from the user to create another workflow (Workflow 2) from the Workflow Builder configuration module for the created ticket family (from step 302), which can be configured similar to the description above with reference to step 306. In this regard, the view(s) created in step 308 may be added to the other workflow, and the other workflow can be mapped, linked, latched, or associated to another domain (Domain 2), subdomain, a category and/or a subcategory, each of which may be mapped or latched to the ticket family as described above.

Next, at step 312, the system and method can receive a request from the user to create master data (e.g., in a resource or database, or as a master data component or file) within the dashboard which can be further attached, latched, mapped, or associated with the created ticket family. The master data are values created or configured for various parameters, such as Domain, Subdomain, Category, Subcategory, Impact, Priority, Urgency, Cause, Resolution, etc. These values may be set by a user via user input fields, such as drop down menus, etc., through which the user can select the relevant values (i.e., the master data) to be assigned to the ticket family. As an example, the user can assign impact value (e.g., high network impact), urgency value (e.g., critical urgency), or priority value (e.g., high priority) to a created ticket family. In addition, it is contemplated within the scope of the present disclosure described herein that the user may also create a sub-ticket family associated with the first created ticket family, wherein the sub-ticket is at a lower hierarchy within the first created ticket family. To this end, an end user may open a sub-ticket while handling a crated ticket (e.g., main ticket) in accordance with a workflow for the ticket family.

Figure 4:
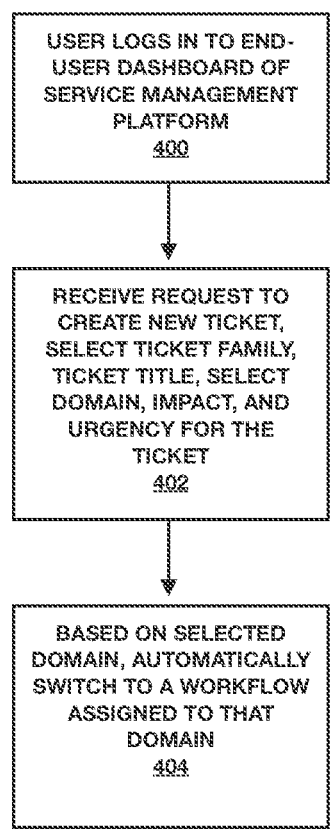
FIG. 4 illustrates a process flow diagram illustrating a method creating a ticket family via an end-user for the service management platform method and system of the disclosure described herein according to one or more embodiments.

FIG. 4 illustrates one exemplary embodiment of a method of operation for an end-user of the to create or open a ticket of the ticket family, wherein the end-user may have different privileges relative to the administrator. In particular, for the service management platform of the disclosure described herein, each user may have different privileges for creating, editing, or managing tickets. For example, a first user (from one department within an organization, such as a support agent) may be able to create a new ticket, whereas another second user (from another department of the organization, such as a technician) may not be able to create new tickets but only modify the status of a particular ticket, such as to "completed" or "closed". Here, each ticket family can include various rules and restrictions associated with it that depend on the user accessing the ticket family.

Referring to FIG. 4, at step 400, an end-user having certain privileges or restrictions associated with it can log in to the service management platform system and method of the disclosure described herein. At step 402, the service management platform may then receive a request from the end-user to create a new ticket, select a ticket family for which the ticket is created or opened, define a ticket title, select a domain, select an impact value, and further select an urgency value associated with the ticket. Next, at step 404, based on the selected domain (such as Domain 2), the system and method of the disclosure described herein can automatically switch to a workflow (such as Workflow 2) an output associated views (such as View 2) assigned or latched to that domain. It is understood that the domain is one example, and different workflows and associated views may be selectively triggered based on a selection of a subdomain, category, or subcategory.

Figure 8:
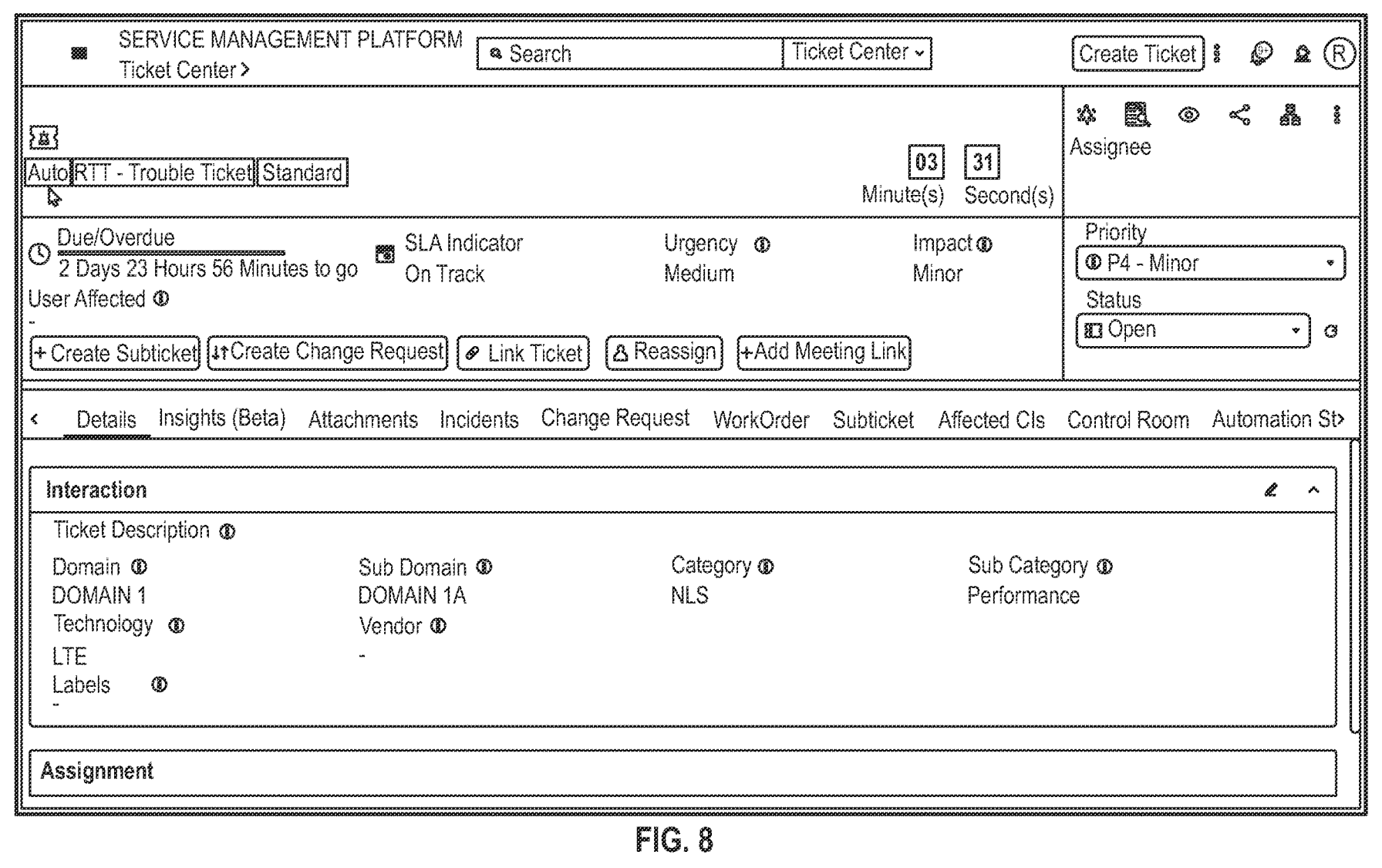

FIG. 8 illustrates one exemplary embodiment of a GUI dashboard for a created ticket. From there, the user can view various details and parameters associated with the ticket. For example, the user can view how long the ticket has been open, due dates/overdue status, service level agreement (SLA) indicator, urgency level, impact level, priority level, and current status, wherein the status can only be changed by the user who has certain privileges (such as from open, to closed, etc.). In addition, from the dashboard of FIG. 8, the user may also be able to create one or more sub-tickets (or a second hierarchy), wherein the sub-tickets are positioned below the first hierarchy of the created ticket and part of the same ticket family. Here, any number of sub-tickets (or child tickets) can be created and their hierarchy's defined relative to each other within the ticket families. In addition, the user may be able to link/map/associate any number of ticket families to other ticket families (or sub-ticket families). Further, the user can also re-assign a ticket to various people, operations, or departments within the organization. In addition, the user may also add any meeting information or meeting links to a ticket. Further, the user may also be able to view specific details associated with the ticket or ticket family, such as the associated domain, subdomain, category, sub-category, and technology area. In addition, the user can view various insights or historical information related to the ticket family, in addition to related incidents, change requests, and work orders, among others.

Root Cause Analysis

Figure 11:
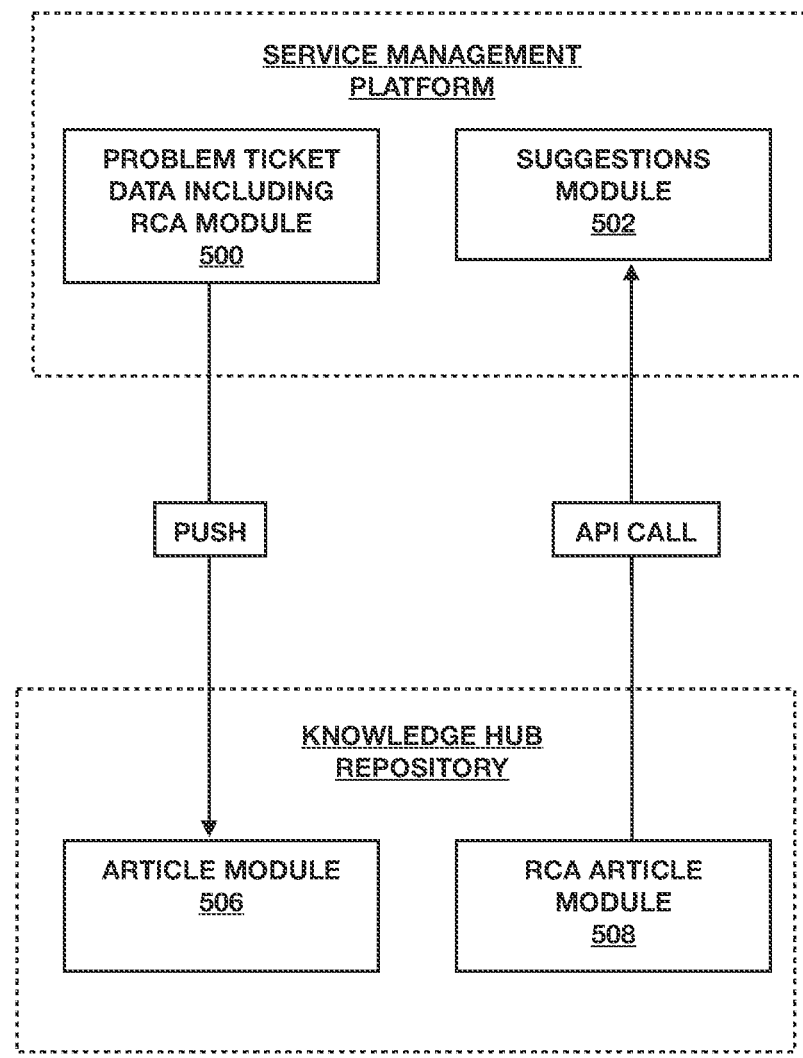
FIG. 11 illustrates a diagram illustrating bidirectional communication between the service management platform and a knowledge hub repository of the disclosure described herein according to one or more embodiments.

FIG. 11 illustrates one exemplary embodiment for a method of bi-directional communication between various modules of the disclosure described herein. In particular, a problem ticket module 500, which can include closed problem tickets including RCA data, can be pushed or sent from the service management platform to an article module 506 within a knowledge hub repository. The knowledge hub repository is a knowledge storage or knowledge base repository (e.g., of an enterprise application platform). The knowledge hub repository according to an example embodiment stores articles, which are pages of textual and graphical content for storing information with easy accessibility. For example, the article may include or be a predefined template for documenting an RCA. To this end, a problem ticket may include a defined template for documenting the RCA for the problem to which the problem ticket pertains. When the RCA is completed (e.g., by an engineer to which the ticket is assigned) and documented in the template (including its resolution), and the ticket is closed, at least the RCA defined in the template is pushed to the knowledge hub repository in the form of an article (though it is understood that the article may further include other information from or related to the ticket).

Subsequently, the service management platform, via a suggestions module 502, can retrieve one or more suggestions for an open problem ticket from the knowledge repository hub (RCA article module 508) via an application programming interface (API) call. For example, a user may input one or more parameters (e.g., ticket family, a title string, a domain, a category, etc.) for the API call, based on which the RCA article module 508 may then determine at least one related or relevant article to provide to the suggestions module 502. The suggestions module 502 may then output the retrieved article(s) as a suggestion to a user (e.g., the user tasked with the open ticket or RCA for the open ticket). According to another embodiment, the suggestions module 502 may autofill the open problem ticket (i.e., autofill the RCA template in the open problem ticket) with information obtained from the retrieved article for review, editing, and validation by the user.

Figure 12:
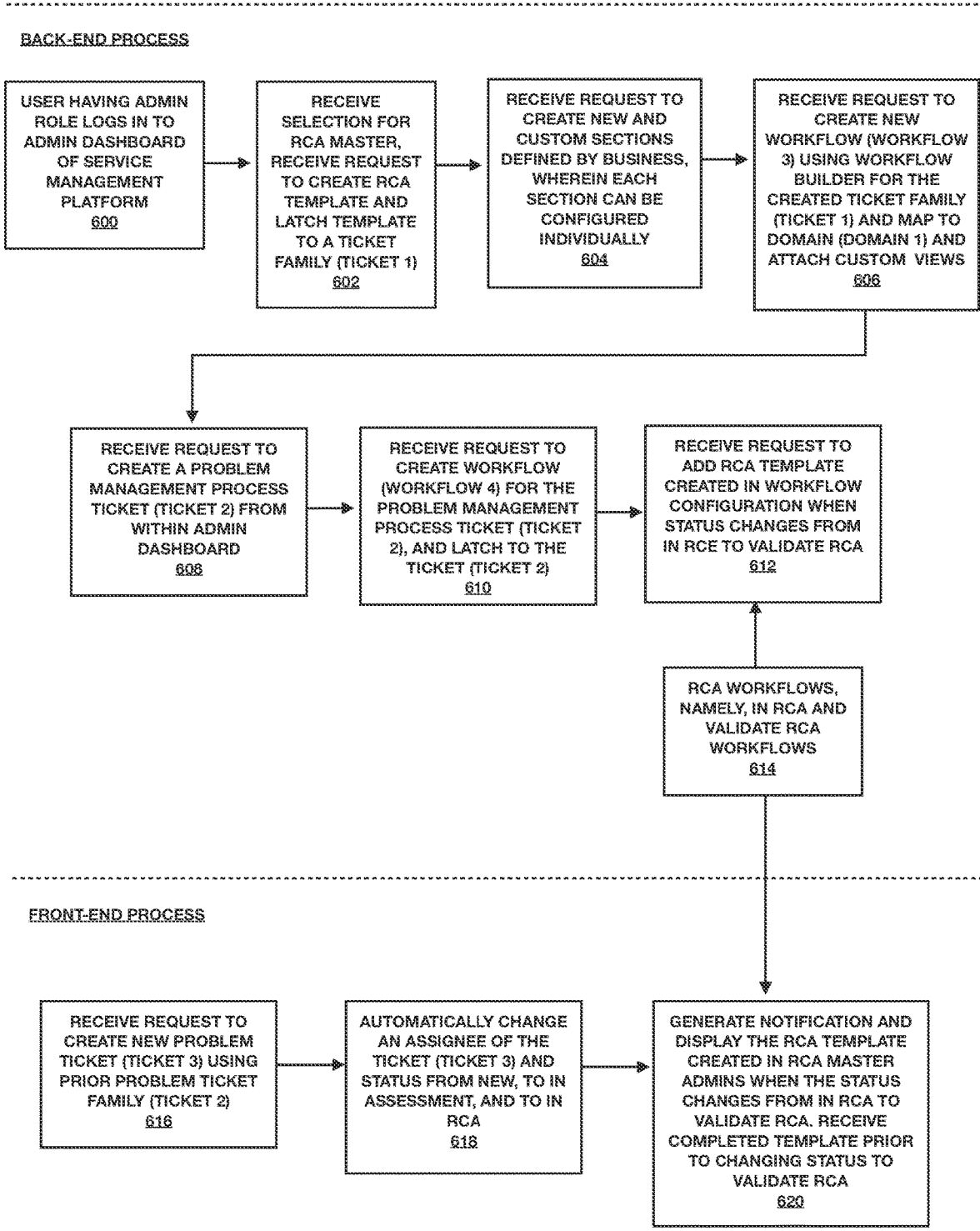
FIG. 12 illustrates a process flow diagram for a back-end process and a front end process for the service platform management system and method of the disclosure described herein according to one or more embodiments.

FIG. 12 illustrates one exemplary embodiment for a method of operation of a back-end process via an administrator and of a front-end process via an end-user for the service management platform method and system of the disclosure described herein. The back-end process creates an RCA template and adds the created RCA template to a particular ticket family and a workflow for that ticket family. Referring to FIG. 12, at step 600, the back-end process can begin by a user (e.g., a user with an admin role or privileges) logging into a dashboard of the service management platform. Here, the user may be presented with a menu or grid to select an RCA Master module (i.e., a module for generating or configuring an RCA template) from among a plurality of different modules or applications (e.g., included in an application platform). An example of such a menu is shown in FIG. 5.

At step 602, the system receives a selection, from the user, of the RCA Master module from the dashboard (FIG. 5) and may execute and output a screen or view of the RCA Master module.

Figure 13:
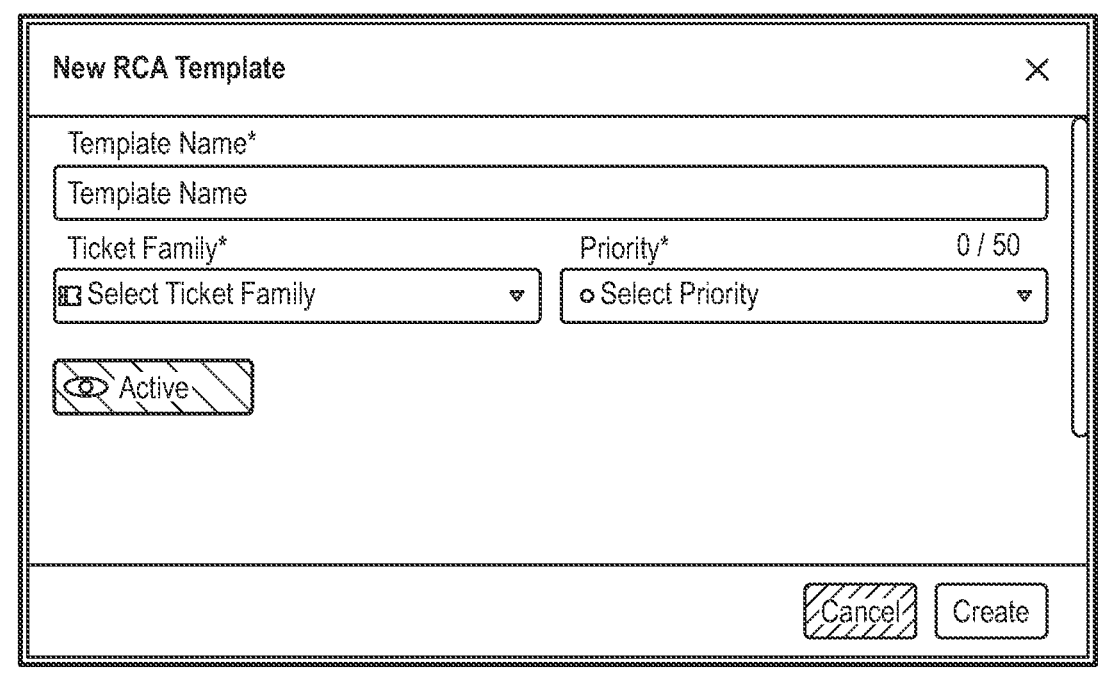
Figure 15:
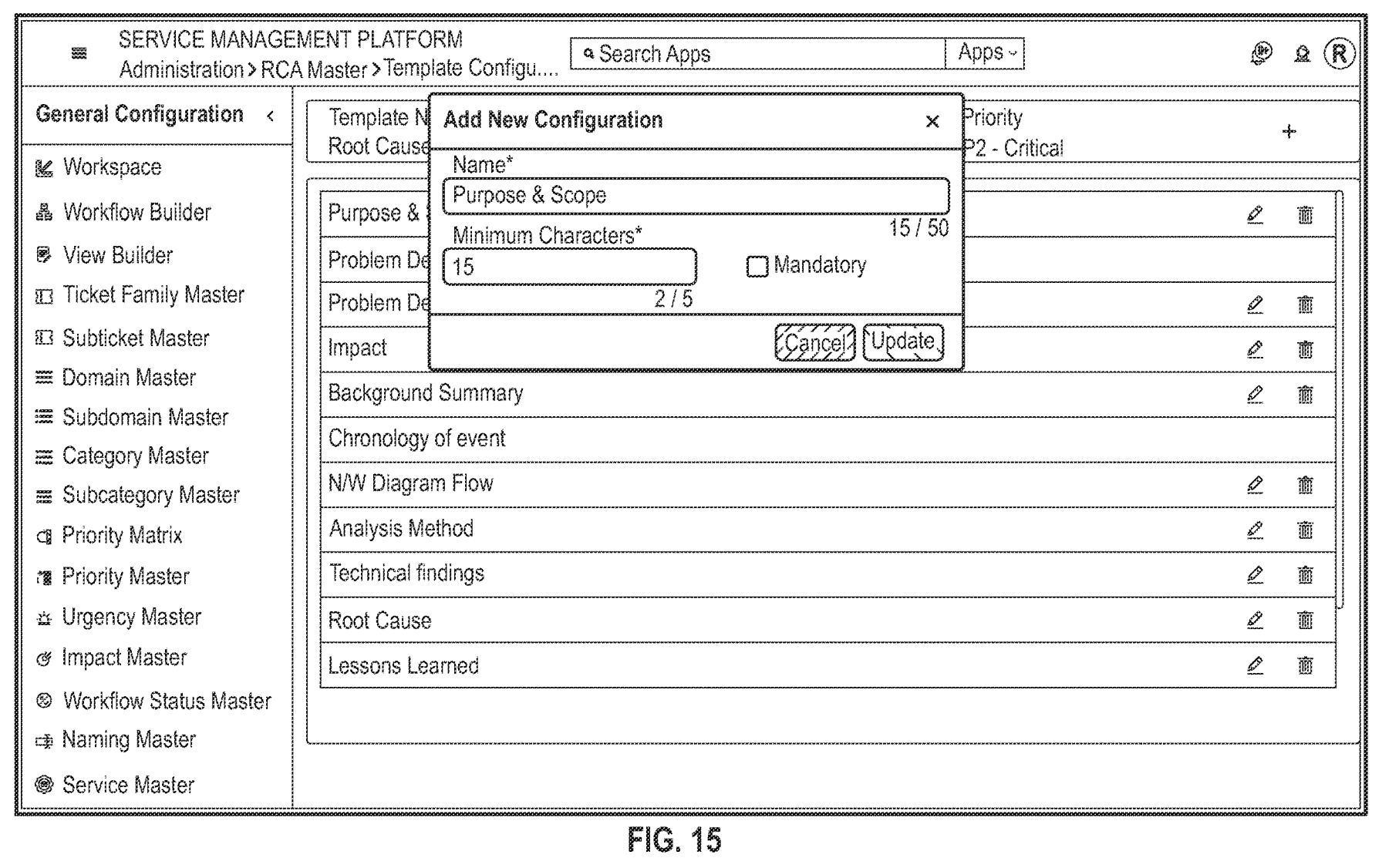
Figure 16:
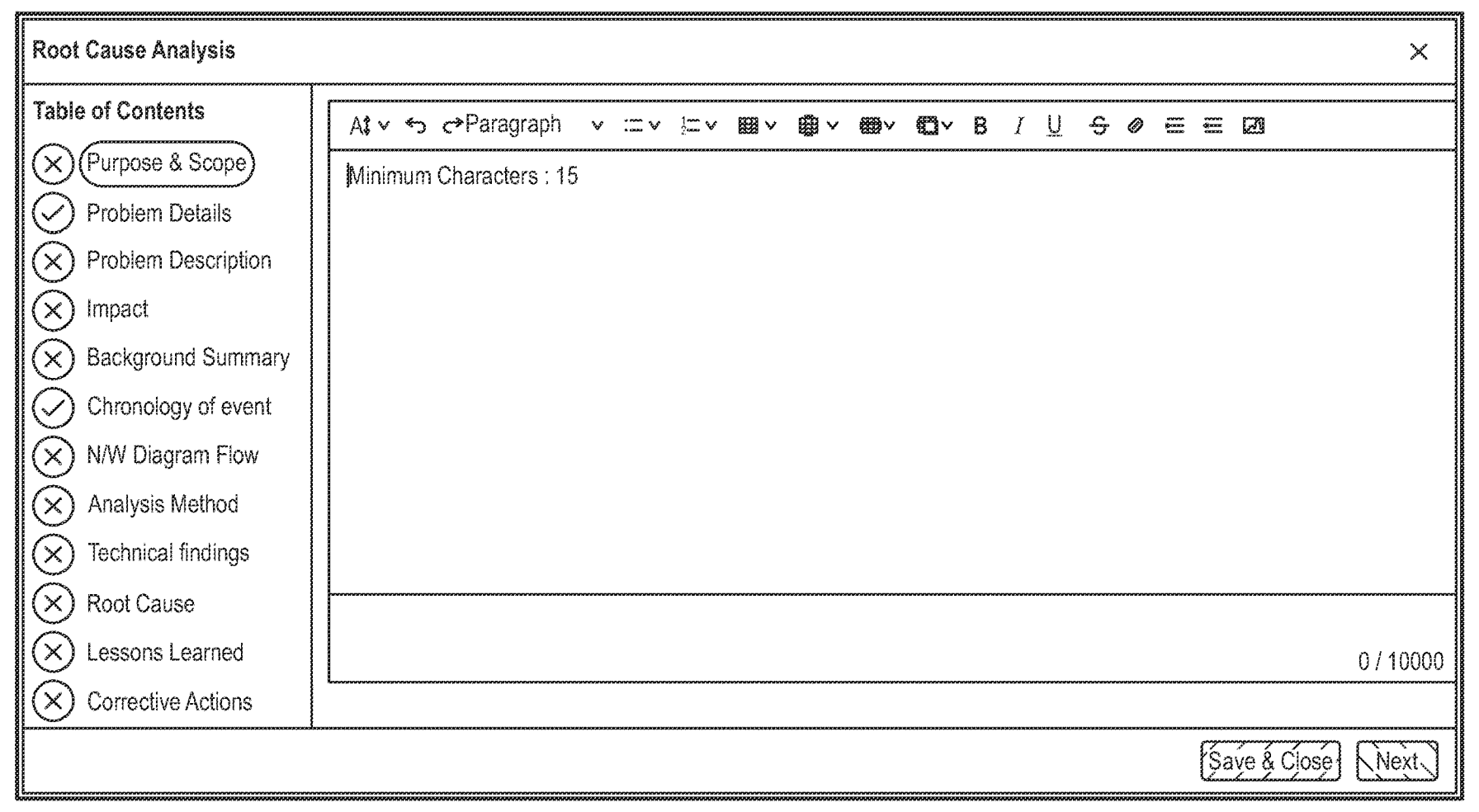

At step 604, the system may receive a user selection to create a new RCA template and may output a user interface allowing a user to create the new RCA template and latch or map the new RCA template to a previously-created ticket family. An example of such a user interface is shown in FIG. 13. As can be seen in FIG. 13, the user may input a name for the RCA template and select a ticket family to which the RCA template will be added. In addition, the system may output a user interface for configuring or defining the new RCA template. For example, in response to a user input to create the new RCA template in the user interface of FIG. 13, the system may output the user interface of FIG. 14 through which the user may add, edit, and configure one or more fields (e.g., user input fields) for the RCA template. The user can create any number of sections (or new configurations) within the RCA template, in which each section (or configuration) can have a minimum number of characters and validation procedures (or restrictions/criteria) and be configured/user-defined independently from each other, such as shown in FIG. 15. In addition, the user can provide specific information or request for information for each section, such as shown in FIG. 16.

Next, at step 606, the system can add the created RCA template to a workflow for a ticket family (i.e., the ticket family to which the RCA template is mapped or added in step 604). For example, the workflow may include a sequence of steps for the ticket family, such as acknowledgment of created problem ticket, assessment of created problem ticket (e.g., "In Assessment"), in RCA for the created problem ticket (e.g., "In RCA"), RCA validation for the created problem ticket ("Validate RCA"), fix in progress based on the RCA, resolution, validation of RCA and solution summary, close ticket). The workflow may be edited via a workflow configuration or builder module. Output and completion of the RCA template may be added to the workflow using this module, such as at the "In RCA" stage of the workflow.

Still referring to FIG. 12, the front end processes of a user or users that create and resolve a ticket is provided in steps 608 through 612. At step 608, the system can receive a request from an end user to open a new problem ticket of the previously created problem ticket family.

Next, at step 610, an end user (e.g., assignee of the opened ticket) can progress through the workflow and change the status of the opened problem ticket to "In RCA".

Next, at step 612, the system displays the RCA template created in the RCA Master configuration module and the end user then enters information into the fields of the RCA template, which is received by the system. To progress to the next stages of the workflow (e.g., from "In RCA" to "Validate RCA"), the end user completes and submits the RCA template. According to example embodiments, the end user may search for (e.g., using one or more keywords or inputs identifying the ticket family, a title string, a description string, at least a portion of an input to any RCA template field, etc.) and/or retrieve one or more related or relevant articles (e.g., completed RCAs of previously closed tickets) from the knowledge hub repository as described above with reference to FIG. 11. Based on the retrieved related article(s), the user may fill the RCA template of the open ticket.

Thereafter, one or more other users or personnel may validate the RCA, fix the problem to which the opened problem ticket pertains based on the RCA, confirm resolution of the problem, submit a solution summary to the ticket (or to the RCA template), and close the ticket. In other embodiments, the system may automatically re-assign a ticket to one or more other users when the status of a ticket changes. According to example embodiments, upon closing the ticket, an article may be generated based on the completed RCA template and stored in the knowledge hub repository as described above with reference to FIG. 11. Accordingly, the RCA can be referred to for any future problem ticket that is opened for an issue, thereby expediting resolution by enabling quick and easy accessibility and identification of the issue at hand and identifying an optimal fix for the issue. Further, as the RCA is documented in a predefined template, related RCAs are easily and quickly sortable, searchable, and identifiable.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The invention claimed is:

1. A method of managing services via a centralized network platform using root cause analysis (RCA), the method comprising:
   configuring a format of a service ticket in response to a first user input;
   based on one or more second user inputs for configuring an RCA template, creating the template, wherein the RCA template comprises a plurality of user input (UI) fields for receiving user input with respect to RCA for the service ticket;
   mapping the RCA template to the service ticket;
   based on one or more third user inputs, obtaining, from a knowledge repository for RCA, inputs to at least one previously completed instance of the RCA template corresponding to a previously closed instance of the service ticket; and
   outputting the obtained inputs to the at least one previously completed instance of the RCA template for display to the user.

2. The method of claim 1, further comprising:
   based on a fourth user input, configuring a workflow for the service ticket.

3. The method of claim 2, wherein the configuring the workflow comprises configuring a stage of the workflow to output the RCA template to receive the user input with respect to the RCA.

4. The method of claim 1, further comprising:
   based on a fifth user input to open an instance of the service ticket, a view of the service ticket to receive the one or more third user inputs to fields of the service ticket; and
   receiving the one or more third user inputs to the view of the service ticket.

5. The method of claim 4, further comprising outputting an instance of the RCA template for completion by a user, in relation to the opened instance of the service ticket.

6. The method of claim 5, further comprising:
   receiving one or more sixth user inputs to the UI fields of the output instance of the RCA template; and
   based on a seventh user input closing the opened instance of the service ticket, storing the received one or more sixth user inputs in the knowledge repository for RCA.

7. A system for managing services via a centralized network platform using root cause analysis (RCA), the system comprising:
   at least one memory storing instructions; and
   at least one processor configured to execute the instructions to:
   configure a format of a service ticket in response to a first user input;
   based on one or more second user inputs for configuring an RCA template, create the RCA template, wherein the RCA template comprises a plurality of user input (UI) fields for receiving user input with respect to RCA for the service ticket; and
   map the RCA template to the service ticket;
   based on one or more third user inputs, obtain, from a knowledge repository for RCA, inputs to at least one previously completed instance of the RCA template corresponding to a previously closed instance of the service ticket; and
   output the obtained inputs to the at least one previously completed instance of the RCA template for display to the user.

8. The system of claim 7, wherein the at least one processor is configured to execute the instructions to:
   based on a fourth user input, configure a workflow for the service ticket.

9. The system of claim 8, wherein the at least one processor is configured to execute the instructions to configure the workflow by configuring a stage of the workflow to output the RCA template to receive the user input with respect to the RCA.

10. The system of claim 7, wherein the at least one processor is configured to execute the instructions to:
    based on a fifth user input to open an instance of the service ticket, output a view of the service ticket to receive the one or more third user inputs to fields of the service ticket; and
    receive the one or more user inputs to the view of the service ticket.

11. The system of claim 10, wherein the at least one processor is configured to execute the instructions to output an instance of the RCA template for completion by a user, in relation to the opened instance of the service ticket.

12. The system of claim 11, wherein the at least one processor is configured to execute the instructions to:
    receive one or more sixth user inputs to the UI fields of the output instance of the RCA template; and
    based on a seventh user input closing the opened instance of the service ticket, store the received one or more sixth user inputs in the knowledge repository for RCA.

13. A non-transitory computer-readable medium comprising computer-executable instructions executable by at least one processor to perform a method of managing services via a centralized network platform using root cause analysis (RCA), the method comprising:

configuring a format of a service ticket in response to a first user input;

based on one or more second user inputs for configuring an RCA template, creating the RCA template, wherein the RCA template comprises a plurality of user input (UI) fields for receiving user input with respect to RCA for the service ticket;

mapping the RCA template to the service ticket;

based on one or more third user inputs, obtaining, from a knowledge repository for RCA, inputs to at least one previously completed instance of the RCA template corresponding to a previously closed instance of the service ticket; and outputting the obtained inputs to the at least one previously completed instance of the RCA template for display to the user.

14. The non-transitory computer-readable medium of claim 13, wherein:

the method further comprises, based on a fourth user input, configuring a workflow for the service ticket; and the configuring the workflow comprises configuring a stage of the workflow to output the RCA template to receive the user input with respect to the RCA.

15. The non-transitory computer-readable medium of claim 13, wherein the method further comprises:

based on a fifth user input to open an instance of the service ticket, outputting a view of the service ticket to receive the one or more third fifth-user inputs to fields of the service ticket; and receiving the one or more third user inputs to the view of the service ticket.

16. The non-transitory computer-readable medium of claim 15, wherein the method further comprises outputting an instance of the RCA template for completion by a user, in relation to the opened instance of the service ticket.

17. The non-transitory computer-readable medium of claim 16, wherein the method further comprises:

receiving one or more sixth user inputs to the UI fields of the output instance of the RCA template; and based on a seventh user input closing the opened instance of the service ticket, storing the received one or more sixth user inputs in the knowledge repository for RCA.

\* \* \* \* \*